July 18, 1939.   J. C. WOODFORD   2,166,924
LIQUID DISPENSING APPARATUS
Filed March 30, 1938    7 Sheets-Sheet 1
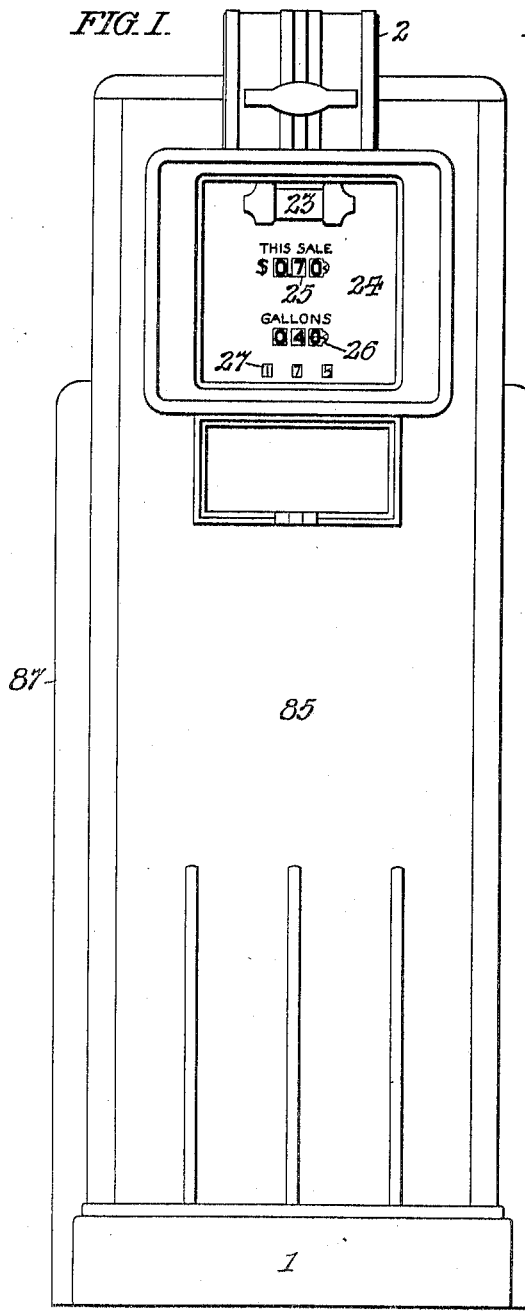
FIG. I.
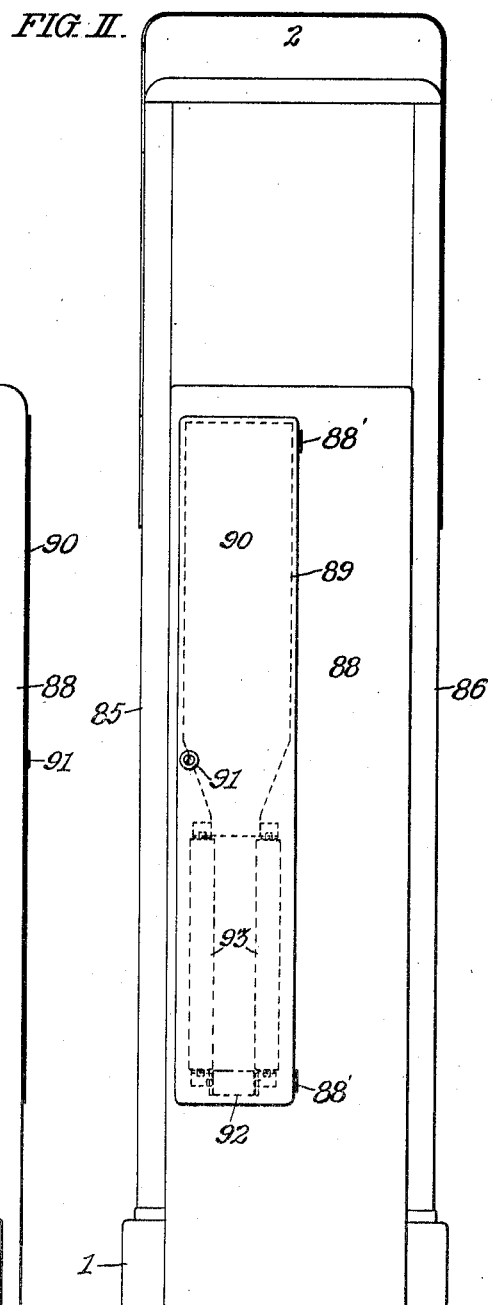
FIG. II.
INVENTOR:
JOSEPH C. WOODFORD,
BY

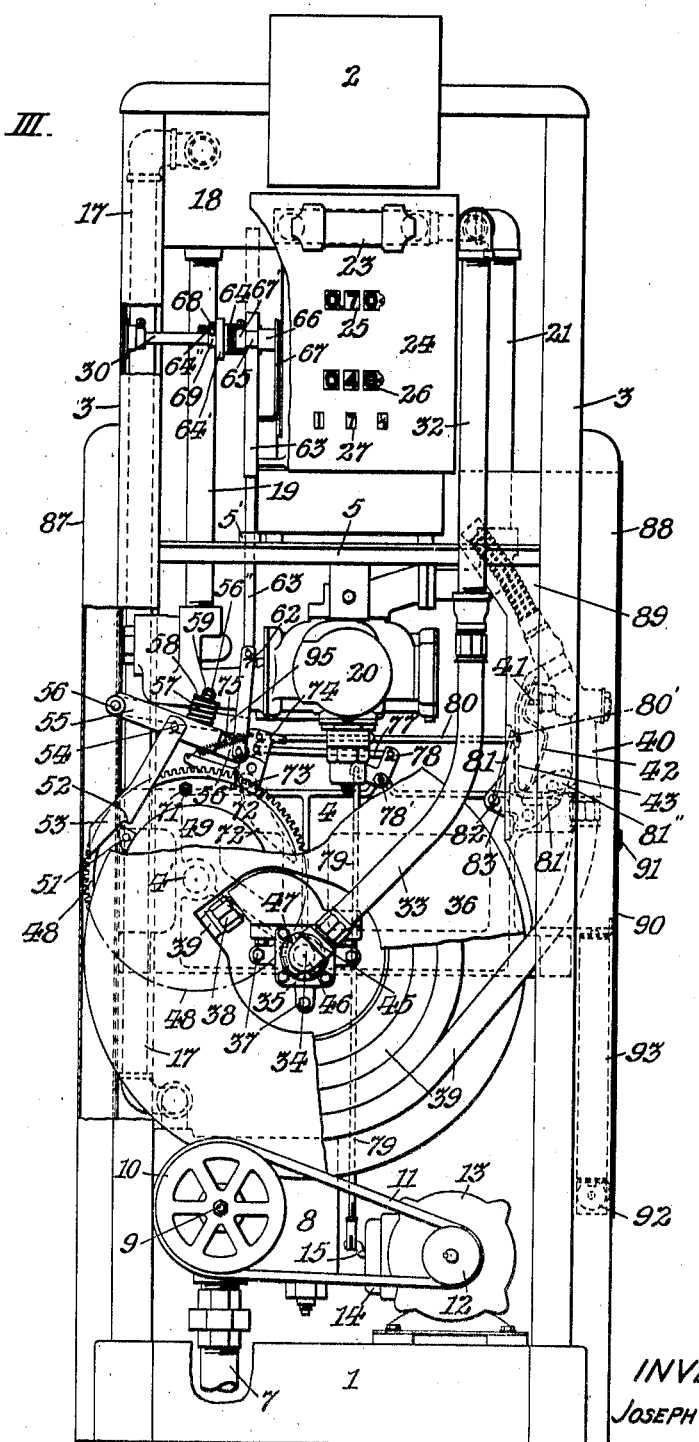

July 18, 1939.  J. C. WOODFORD  2,166,924
LIQUID DISPENSING APPARATUS
Filed March 30, 1938      7 Sheets-Sheet 3
FIG. IV.
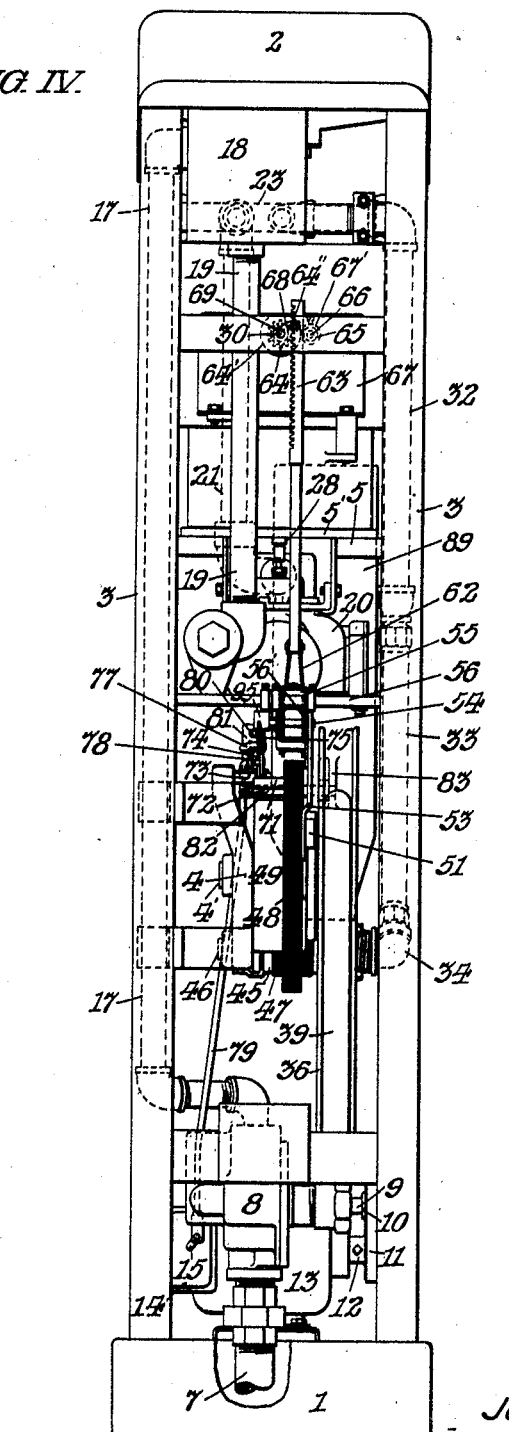
INVENTOR:
JOSEPH C. WOODFORD,
BY July 18, 1939.  J. C. WOODFORD  2,166,924
LIQUID DISPENSING APPARATUS
Filed March 30, 1938   7 Sheets-Sheet 4
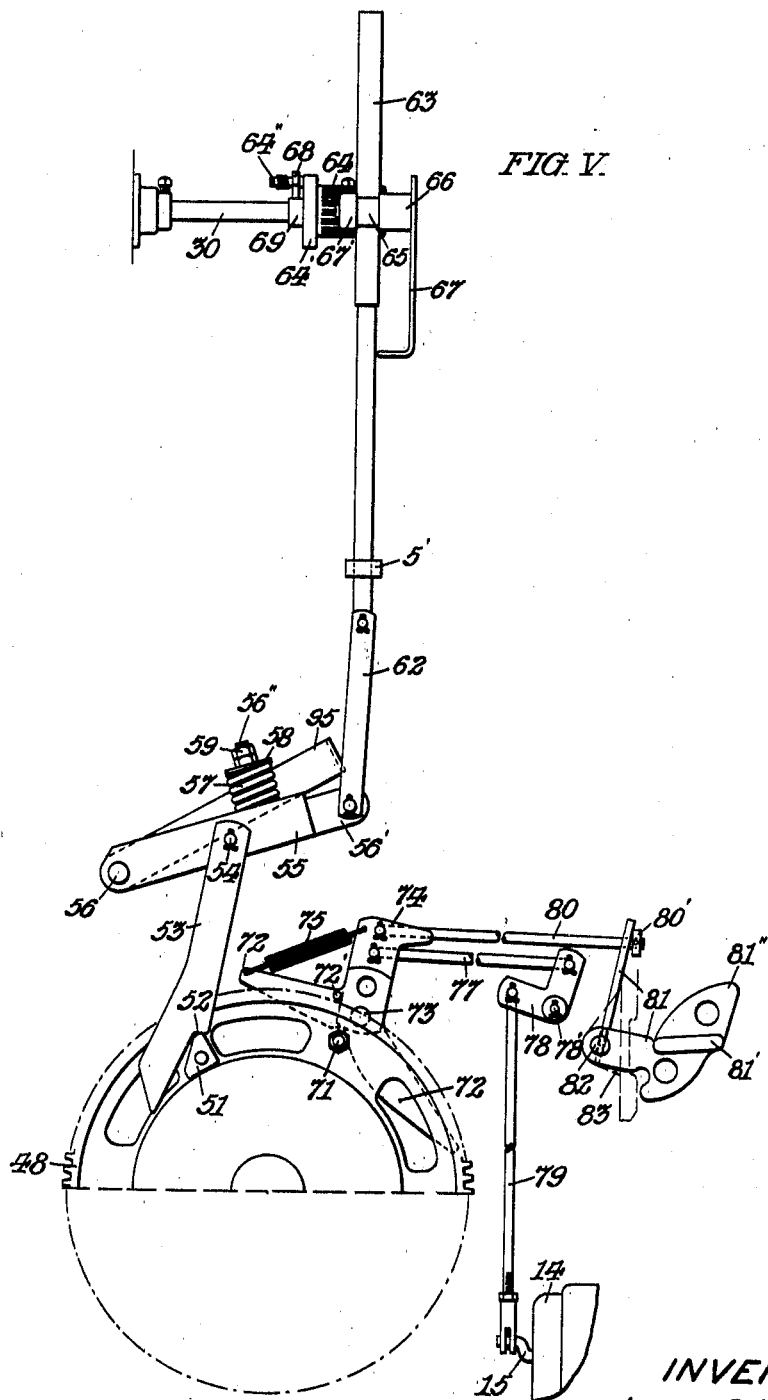
FIG. V.
INVENTOR:
JOSEPH C. WOODFORD,
BY

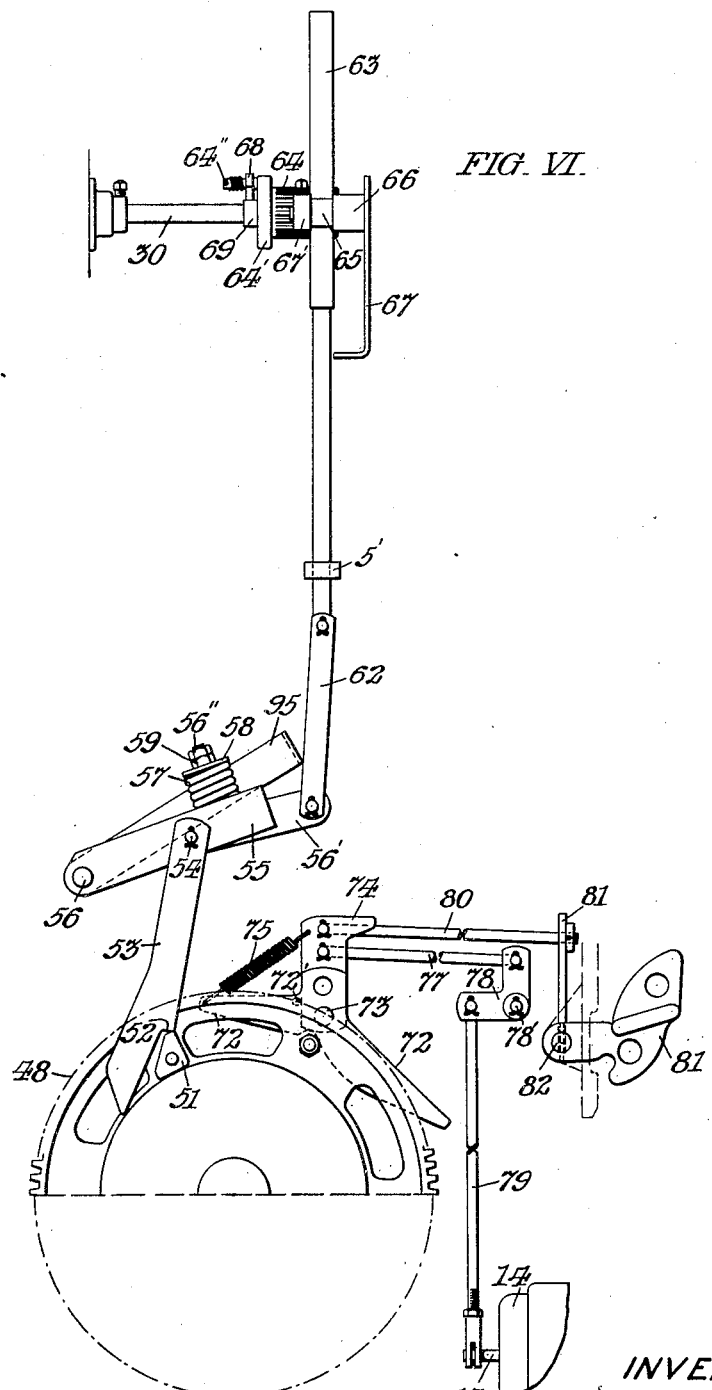

July 18, 1939. J. C. WOODFORD 2,166,924
LIQUID DISPENSING APPARATUS
Filed March 30, 1938 7 Sheets-Sheet 6
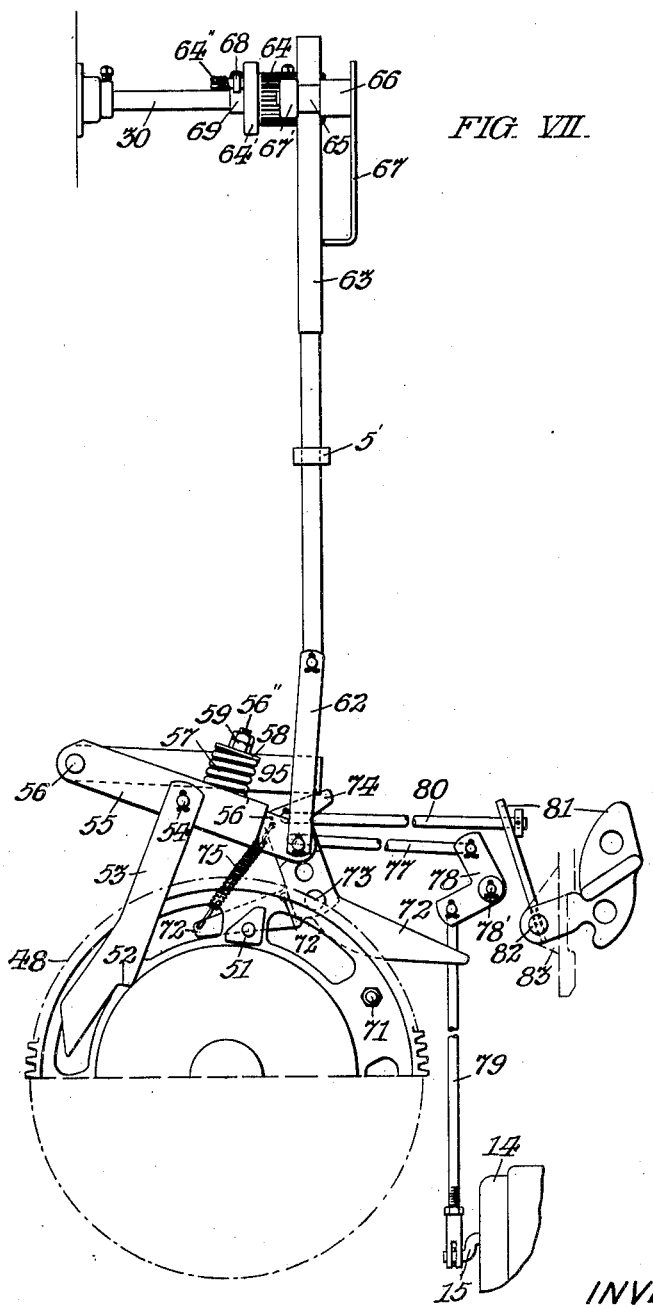
FIG. VII.
INVENTOR:
JOSEPH C. WOODFORD,
BY

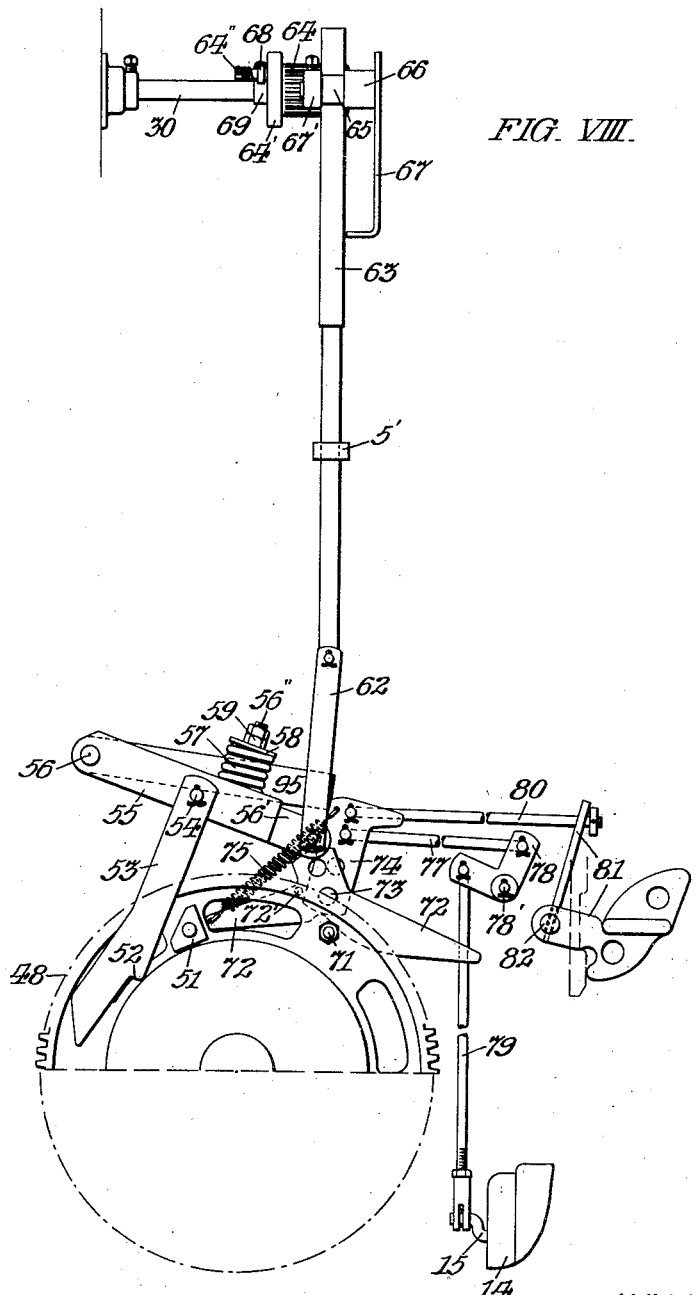

Patented July 18, 1939

2,166,924

UNITED STATES PATENT OFFICE 2,166,924

LIQUID DISPENSING APPARATUS

Joseph C. Woodford, Wayne, Pa., assignor to John Wood Manufacturing Company, Inc., Conshohocken, Pa., a corporation of Delaware Application March 30, 1938, Serial No. 198,813

6 Claims. (Cl. 221—95)

My invention is particularly applicable to metering pumps for dispensing gasolene and of what is known as the "curb-stand" type, to wit, apparatus in which the pump is mounted in a stationary casing adjacent to the curb of a street or driveway. The pump in such casing is arranged to be driven by an electric motor, controlled by a switch within the casing, and said pump is connected by a conduit with a reservoir of the liquid to be dispensed, conveniently an underground tank, from which the pump draws the liquid and delivers it under pressure through a flow meter and flexible dispensing hose; the latter being provided with a dispensing nozzle including a manually operative valve which, when released by the operator, is automatically shut to retain the liquid in the hose.

As ordinarily constructed, all of the liquid conduits within the casing are rigid and the flexible hose is connected therewith by a rigid coupling projecting to the exterior of the casing near the top thereof. The dispensing hose, which is usually about ten feet in length, is suspended in a bight from said coupling and supported in idle position upon a projection from the casing; so that it may be readily lifted by the operator and extended to the receptacle into which the liquid is to be dispensed, usually the tank of an automobile. Consequently, the hose thus exposed is accessible to the general public and may be detached or mutilated by any vandal, and its length is necessarily limited to avoid dragging it on the pavement.

Therefore, it is an object and effect of my invention to provide liquid dispensing apparatus with a much longer hose and consequent radius of service, and automatic means to stop the pump in case of fire and desertion of the apparatus by the operator, including an exterior casing containing not only the metering pump, flow meter and registering mechanism for indicating the amount of liquid dispensed, but also containing a rotary reel upon which the dispensing hose is normally wound and secluded within said casing, but said nozle is accessible upon opening a lockable door so that the operator may withdraw the hose against the stress of means tending to retract it and rewind it upon the reel. Such construction and arrangement has the advantages of protecting the hose and its nozle from vandalism, and adverse weather conditions. That is to say; the hose and nozle are protected from snow and ice in winter weather and from destructive effects of direct sunlight.

Ordinarily, it is necessary for the operator to open the electric switch by separate manual operation, to stop the operation of the pump which has been initiated by manually closing the switch. Therefore, I find it convenient to provide switch controlling means in cooperative connection with the hose reel, so that the switch may be alternately closed to initiate the operation of the pump and opened to stop it by manipulation of the hose without requiring separate movement by the operator to control the switch.

Moreover, such apparatus ordinarily includes manually operative means for setting the registering mechanism back to zero position after each dispensing operation. In order to prevent the operator from cheating the customer by failure to zeroize the register after each dispensing operation; it is desirable to provide means for insuring that the register mechanism shall be zeroized after each dispensing operation before the next dispensing operation can be initiated. However, the construction and arrangement of my invention as hereinafter described are such that the operator may permit the hose to be partially retracted within the casing, but not far enough to shut off the motor switch, and again withdraw it, if it is desired to interrupt a dispensing operation, for instance, if a customer desires a quantity of gasolene deposited in an automobile tank and an additional quantity in a portable can.

My invention includes the various novel features of construction and arrangement hereinafter more definitely specified, including two adjunctive devices, viz., first, a lever linkage connecting the rotary hose reel with the electric switch and also with a lever within the casing, which lever is adapted to be moved to a predetermined position by the placing of the hose nozle in its idle position, to insure that the electric switch shall be opened and the pump stopped when the nozle is placed in its normal idle position. Second, another lever linkage arranged to be actuated by a tappet cam on the reel, for controlling the zeroizing means.

In said drawings; Fig. I is a front elevation of apparatus embodying my invention.

Fig. II is an elevation of the right hand side of the casing shown in Fig. I.

Fig. III is also a front view of the apparatus, but with parts of the casing removed to show the construction and arrangement of the mechanism contained therein.

Fig. IV is an elevation of the mechanism shown in Fig. III as seen from the left hand side of that figure.

Figs. V to VIII, inclusive, are fragmentary elevations of parts of the mechanism shown in Fig. III but showing respectively different positions of the lever linkages aforesaid.

Fig. III shows the normal idle position of the apparatus with the casing closed secluding the hose and nozzle from access. Figs. V, VI, and VII show successive positions of parts of the apparatus shown in Fig. III in a normal single operation. In the positions of Figs. V and VI the motor switch may not be closed by upward hand movement of the hose supporting lever to effect dispensing. In Fig. VII said switch has been closed automatically by withdrawal of the hose. Fig. VIII shows the switch locked in open position when the hose has been retracted far enough to open said switch but not to the extreme limit shown in Fig. III, at which the set-back mechanism can be operated by withdrawal of the hose.

In said figures; the housing for supporting the apparatus includes the base member 1 and top member 2 which are connected by four vertical corner standards 3. Said standards are also connected by the transverse frame members 4 and 5.

The liquid to be dispensed is conveniently stored in a tank subjacent to said base member 1 from which the conduit 7 leads to the casing of the pump 8, which includes a rotor having the shaft 9 which, as shown in Fig. III, is provided with the pulley 10. Said pulley is connected by the belt 11 with the pulley 12 on the electric motor 13 which is mounted on said base 1 and which is controlled by the switch 14 provided with the actuating crank 15.

Said pump 8 has the conduit 17 leading to the vapor separator 18. The conduit 19 extends from the bottom of said separator 18 to the meter 20, from which the conduit 21, shown in Fig. III, extends to the visible flow indicator comprising the glass tube 23.

Said flow indicator 23 is conveniently presented in front of the face plate 24 of computing registering mechanism which includes visible indicating means 25, 26, and 27, respectively indicating the value, volume, and unit price of the liquid being dispensed. Said means are presented at window openings in said face plate and actuated by the shaft 28 which is operatively connected with a rotor in said meter 20. The indicating means 25 and 26 may be manually reset by rotation of the register reset shaft 30 in the usual manner. Said indicator mechanism and its appurtenances are not herein claimed, but, as hereinafter described, when the hose is permitted to be retracted by the spring motor to the position shown in Fig. III, a lever linkage arranged to be actuated by rotation of the reel is engaged to automatically reset the indicators to zero position, at the start of the next withdrawal of the hose.

The conduit 32 depends from said flow indicator and is connected by the flexible hose 33 with the swivel coupling 34 through which the liquid to be dispensed is delivered into the reel hub including the box 35 which is rigidly connected with the rotary hose reel 36; conveniently by the tap bolts 37. Said box has rigidly connected therewith the coupling 38 to which the inner end of the dispensing hose 39 is connected, as shown in Fig. III. Said hose 39 has at its outer end the nozle 40 provided with the valve 41 which may be manually opened by the lever 42 within the nozle guard 43, but is spring pressed to close it.

Said box 35 has in rigid relation therewith the hub sleeve 45, indicated in Fig. IV, which is mounted to turn freely on the stationary stud shaft 46 which is rigidly mounted in said frame 4 which, as indicated in Fig. III, extends between two of the opposite corner standards 3. Said hub sleeve 45 carries the gear pinion 47 in coaxial relation with said reel 36 and in mesh with the gear 48 rigidly connected with the spring motor comprising the casing 49 which contains a spring, not shown. Said casing is journaled on the stationary stud shaft 4' fixed in said frame 4, and said gear 48 makes less than one revolution, clockwise in Fig. III, upon the withdrawal of the hose 39 to the limit of its extent from the reel 36, by the operator.

Said gear 48 has rigidly connected therewith the cam 51, shown in Fig. III, which in the normal idle position shown in said figure is below the shoulder 52 of the pawl lever 53 which is the initial member of the lever linkage for operating said reset shaft 30. Said pawl lever 53 is connected by the pivot 54 with the lever 55 which is fulcrumed on the stationary stud shaft 56 which is rigidly connected with two of said frame standards 3. Said lever 55 is conveniently formed as a U-shaped channel bar having its parallel flanges depending upon opposite sides of the lever member 56' which is fulcrumed on said pivot 54 and normally upheld in said lever 55 by the spring 57 which is compressed between the upper surface of said lever 55 and the washer 58 which is held by the nuts 59 engaging the bolt 56'' which is connected with said lever member 56'. Therefore, said lever 56' is initially moved by the cam 51 and pawl lever 53 as if it were rigidly connected with the lever 55 and until it meets such resistance as to compress said spring 57, as hereinafter described. Said lever 56' is pivotally connected by the link 62 with the vertically reciprocatory rack bar 63 which, as shown in Fig. III, is supported in the guide bearing 5' on the transverse frame member 5 and is held in engagement with the pinion 64 journaled on said shaft 30 by the guide roller 65. Said roller is journaled on the stud 66 carried by the bracket 67 fixed to the frame of the register mechanism. Said roller 65 is held on said stud 66 by the set collar 67'. Said pinion 64 has the flange 64' which carries, on the stud 64'', the pawl 68 which is continually spring pressed to engage a single notch in the ratchet collar 69 which is fixed on said shaft 30. The construction and arrangement last described are such that when the operator starts to withdraw the dispensing hose 39 from the reel 36 the rack bar 63 is moved from the position shown in full lines to the position shown in dotted lines in Fig. III with the effect of turning said reset shaft 30 to zeroize the register. When the zero position of the register is reached a stop therein, not shown, is encountered and offers such resistance that farther movement of said lever 55 merely compresses said spring 57 as above contemplated; thus insuring that the movement of said levers 55 and 56' shall be sufficient to effect complete zeroizing movement of the register, without undue stress upon it.

Said spring motor gear 48 also carries the crank pin 71 to operate the cam lever 72 which is fulcrumed on the stud 73 fixed in said frame 4. Said cam lever 72 is the initial member of the lever linkage for operating said motor switch 14 by the crank 15, and has the crank pin 72' for actuating the switch lever 74 which is fulcrumed on said stud 73 adjoining said lever 72. The spring 75, shown in Fig. III, connecting the left hand end of said lever 72 with the upper end of said lever 74 continually tends to hold said levers in the relative position shown in Fig. III, but permits relative movement of said levers as hereinafter described.

As shown in Fig. III, said switch lever 74 is pivotally connected by the link 77 with the bell crank lever 78 which is fulcrumed on the stud 78' fixed in said frame 4. Said lever 78 is also pivotally connected with the switch plunger rod 79, the lower end of which is operatively connected with said switch crank 15; so that when said spring motor gear 48 is turned clockwise by the withdrawal of the hose from said reel, far enough to cause said crank pin 71 to pass under the right hand cam portion of said lever 72, the effect is to pull said switch lever counter-clockwise by the spring 75 and depress said switch plunger rod 79 and turn said switch crank 15 to close the switch 14 and energize the electric motor 13 and start the pump 8; unless said switch lever 74 is held against the stress of said spring 75 as hereinafter described.

In the embodiment of my invention chosen for illustration, the dispensing hose 39 is eighteen feet in length and withdrawal of but three feet of it from the hose reel 36 is sufficient to first zeroize the indicator by the lever linkage of which the initial member is the pawl lever 53, and, second, to close the switch to initiate the flow of liquid to be dispensed by operation of the lever linkage of which said cam lever 72 is the initial member.

Said switch lever 74 is also pivotally connected with the link 80, the right hand end of which extends through a hole in the hose supporting lever 81 and is provided at its right hand end with the collar 80', whereby said lever 81 may be turned counter-clockwise by traction on said link 80 toward the left in Fig. III, but said lever 81 may move freely along said link 80 toward the left in Fig. III. Said lever 81 is fixed on the shaft 82 which is journaled in the bracket 83 which is rigidly connected with the inner wall of the recess 89, at the right hand side of Fig. III.

As shown in Fig. III; said hose supporting lever 81 has the lug 81' at its right hand end upon which the nozzle guard 43 is adapted to rest and uphold the nozzle 40 in the idle position shown. Said guard is bifurcated at its lower end to permit the lug 81'' to extend through it and in effect form a hook to uphold said nozzle 40 by said guard 43.

The construction and arrangement above described for controlling the motor switch are such that the operator may stop the pump at any time regardless of said cam lever 72, by depressing the right hand end of said hose supporting lever 81, either directly by hand or by resting the hose nozzle 40 on the lug 81'.

As shown in Figs. I and II, the mechanism above described is inclosed in a sheet metal casing comprising a front panel 85, back panel 86, left hand panel 87, and right hand panel 88, which are rigidly connected at their edges with said four standards 3. Said panel 88 has the recess 89 provided with the door 90 connected with said panel 88 by hinges 88' and provided with a lock 91 adapted to be controlled by a key.

Said recess 89 is adapted to receive and seclude the outer end of the hose 39 and its nozzle 40 behind said door 90. As indicated in Figs. II and III, the lower end of said recess is provided with the horizontal roller 92 and opposite vertical side rollers 93 to facilitate the passage of the hose 39 to and from said recess 89 through the doorway and either forward or backward from the apparatus casing, with the minimum amount of friction.

Fig. III shows the apparatus in its normal condition, in which the indicating means 25 shows the value and the indicating means 26 shows the volume of the liquid dispensed at the last preceding dispensing operation; to wit, four gallons at seventeen and one-half cents per gallon, with a value of seventy cents. Such showing remains until the hose is withdrawn by the operator for the next dispensing operation, whereupon, the indicator is zeroized as above described.

In the normal operation of the apparatus the operator removes the hose nozzle 40 from the supporting hook flange 81'' of the hose supporting lever 81, leaving said lever 81 free to be turned counter-clockwise automatically. The operator carries the hose nozzle toward the automobile to be served, thereby withdrawing the hose 39 from the reel 36 and causing counter-clockwise rotation of the reel. As the hose starts to leave the reel, the spring motor and its gear 48 start to turn clockwise, thus driving the cam 51 upward to engage the shoulder 52 in the pawl lever 53. As the hose is pulled out of the reel, said cam 51 pushes the pawl lever 53 and the double lever 55 and 56' upward to the position shown in Fig. V, turning the reset shaft 30 by the rack 63, pinion 64, pawl 68, and single toothed ratchet 69, as above described.

In the position shown in Fig. V the crank pin 71 has been brought into contact with the cam lever 72, but has not moved the latter from the position shown in Fig. III. However, as the hose is further withdrawn from the reel, the reset shaft 30 is turned until the indicators have reached zero position in which the turning movement of said shaft is abruptly stopped by the means within the indicator casing. As withdrawal of the hose continues after the reset shaft 30 has been stopped, the spring 57 is further compressed by upward movement of said lever 55, without further movement of said lever 56', and to the extent shown in Fig. VI, wherein the cam 51 on the gear 48 is about to slip from the shoulder 52 on the pawl lever 53 and release the latter. Such movement of the parts from the position shown in Fig. V to the position shown in Fig. VI has turned the cam lever counter-clockwise and thrust the switch crank 15 halfway down; incidentally tilting the outer end of the nozzle supporting lever 81 upward.

Continued withdrawal of the hose 39 turns the gear 48 from the position shown in Fig. VI to the position shown in Fig. VII, releasing the pawl lever 53 from the cam 51 and permitting the spring 57 to straighten the double lever 55 and 56' which drops with the pawl 53, link 62, and rack 63 to the position shown in Fig. VII. The pivot stud 54 carried by said lever 55 and upon which the lever 56' is fulcrumed, normally supports the detent lever 95 which is also fulcrumed on the stud 56 with said lever 55. The movement of the gear 48 from the position shown in Fig. VI to the position shown in Fig. VII has turned the cam lever counter-clockwise with the effect of depressing the switch crank 15 to its closed position; incidentally tilting the outer end of the hose supporting lever 81 further upward. Said switch 14 is of the spring snap type so that it tends to hold itself in either the "on" or "off" position when positively moved to either by the means above described. As shown in Fig. VII, the upper end of said switch lever 74 is extended toward the right and catches the right hand end of said detent lever 95 which it supports.

When the hose is released, by the operator approaching the apparatus casing far enough to let the spring motor turn counter-clockwise and thrust the crank pin 71 on its gear 48 along the inclined lower edge of the left hand portion of the cam lever 72; said lever 72 is turned clockwise by said pin 71, the detent lever 95 falls into engagement with the left hand edge of the switch lever 74, as shown in Fig. VIII, and continued clockwise movement of said lever 72 moves switch 14 to open position.

Fig. VIII shows a condition which occurs when the hose has been far enough retracted to thus shut off the motor switch but not far enough to engage the cam 51 with the shoulder 52 on the pawl lever 53, and if the operator withdraws the hose again. In that condition although the crank pin 71 encounters the right hand cam surface of the cam lever 72 and turns said lever counter-clockwise; such movement can not restart the motor because the detent lever 95 continues to engage the switch lever 74, as shown in Fig. VIII, and prevents the counter-clockwise movement of the switch lever. Consequently, the only effect of the counter-clockwise movement of the cam lever 72 by such withdrawal of the hose is to stretch the spring 75, and it is necessary for the operator to permit the hose to be entirely retracted by the spring motor, so as to re-engage the cam 51 with the shoulder 52 on the pawl lever 53, and then withdrawn with the effect of zeroizing the indicator mechanism as above contemplated, before the switch 14 can be closed to energize the motor by the linkage including said cam lever 72 and link 77, etc. The loose connection of the link 80 with the hose supporting lever 81 is merely to permit the operator to manually move the motor switch at any time to stop the motor and allow the motor switch to be held in its open position when the hose nozzle is hung on the hose supporting lever 81.

However, I do not desire to limit myself to the precise details of construction and arrangement herein set forth, as it is obvious that various modifications may be made therein without departing from the essential features of my invention as defined in the appended claims.

I claim:

1. In liquid dispensing apparatus having flow establishing means including a pump, a register for indicating the quantity of liquid dispensed at each dispensing operation and reset mechanism for zeroizing said register, the combination therewith of controlling mechanism for the flow establishing means comprising switch means and a hose supporting lever under hand control for starting said pump, and means to stop said pump by opening said switch, including a hose reel, a liquid dispensing hose connected at one end to said reel, a spring continually stressing said reel to retract and wind said hose thereon; and a lever and linkage, in said casing, connecting said hose reel with said switch and hose supporting lever; whereby said hose supporting lever may be tilted by the weight of the hose, when the hose is in idle position, to open said switch by said linkage and stop said pump.

2. In liquid dispensing apparatus having flow establishing means, a register for indicating the quantity of liquid dispensed at each dispensing operation and reset mechanism for zeroizing said register, the combination therewith of controlling mechanism for the flow establishing means comprising means under hand control for starting said flow, a hose reel, a liquid dispensing hose, connected at one end to said reel, a spring motor continually stressing said reel to retract and wind said hose thereon; a tappet cam on said spring motor; and a lever and linkage, in said casing, arranged to be actuated by said cam for controlling said zeroizing means.

3. In liquid dispensing apparatus, including a pump, an electric motor operatively connected with said pump, an electric switch for controlling the operation of said motor and pump; a meter having an inlet connected with said pump, and an outlet, a registering mechanism operatively connected with said meter, for indicating the volume of liquid dispensed through said meter; manually operative means for zeroizing said register; a rotary hose reel, having an axial conduit connected with said meter outlet; a flexible hose normally carried by said reel and having a rotary coupling connecting its inner end with said axial conduit and having at its outer end a nozzle with a manually operative valve; a spring motor continually tending to turn said reel to wind said hose on it; an exterior casing having a movable door and means for locking said door and normally inclosing and secluding all of said apparatus; a lever within said casing adapted to support the hose nozle in idle position in registry with said door; a lever and linkage, in said casing, connecting said hose reel with said switch and lever; whereby said lever may be tilted by the weight of the hose nozle, when the hose is in idle position, to open said switch by said linkage and stop said pump; a tappet cam on said spring motor; and another lever and linkage, in said casing, arranged to be actuated by said cam for controlling said zeroizing means.

4. In liquid dispensing apparatus, including a pump, an electric motor operatively connected with said pump, an electric switch for controlling the operation of said motor and pump; a meter having an inlet connected with said pump, and an outlet, a registering mechanism operatively connected with said meter, for indicating the volume of liquid dispensed through said meter; manually operative means for zeroizing said register; a rotary hose reel, having an axial conduit connected with said meter outlet; a flexible hose normally carried by said reel and having a rotary coupling connecting its inner end with said axial conduit and having at its outer end a nozle with a manually operative valve; a spring continually tending to turn said reel to wind said hose on it; an exterior casing having a movable door and means for locking said door and normally inclosing and secluding all of said apparatus; and a lever within said casing adapted to support the hose nozle in idle position in registry with said door.

5. In liquid dispensing apparatus, including a pump, an electric motor operatively connected with said pump, an electric switch for controlling the operation of said motor and pump; a meter having an inlet connected with said pump, and an outlet, a registering mechanism operatively connected with said meter, for indicating the volume of liquid dispensed through said meter; manually operative means for zeroizing said register; a rotary hose reel, having an axial conduit connected with said meter outlet; a flexible hose normally carried by said reel and having a rotary coupling connecting its inner end with said axial conduit and having at its outer end a nozle with a manually operative valve; a spring continually tending to turn said reel to wind said hose on it; an exterior casing having a movable door and means for locking said door and normally inclosing and secluding all of said apparatus; a lever within said casing adapted to support the hose nozle in idle position in registry with said door; and a lever and linkage, in said casing, connecting said hose reel with said switch and lever; whereby said lever may be tilted by the weight of the hose nozle, when the hose is in idle position, to open said switch by said linkage and stop said pump; and a cam arranged to be operated in opposition to the stress of said spring during the initial movement of withdrawal of the hose from said reel, to close said switch by said linkage and start said pump.

6. In liquid dispensing apparatus, including a pump, an electric motor operatively connected with said pump, an electric switch for controlling the operation of said motor and pump; a meter having an inlet connected with said pump, and an outlet, a registering mechanism operatively connected with said meter, for indicating the volume of liquid dispensed through said meter; manually operative means for zeroizing said register; a rotary hose reel, having an axial conduit connected with said meter outlet; a flexible hose normally carried by said reel and having a rotary coupling connecting its inner end with said axial conduit and having at its outer end a nozle with a manually operative valve; a spring continually tending to turn said reel to wind said hose on it; an exterior casing having a movable door and means for locking said door and normally inclosing and secluding all of said apparatus; a lever within said casing adapted to support the hose nozle in idle position in registry with said door; and a lever and linkage, in said casing, connecting said hose reel with said switch and lever; whereby said lever may be tilted by the weight of the hose nozle, when the hose is in idle position, to open said switch by said linkage and stop said pump.

JOSEPH C. WOODFORD.